United States Patent
Hu et al.

(10) Patent No.: US 11,028,887 B2
(45) Date of Patent: Jun. 8, 2021

(54) METHOD AND APPARATUS FOR CORRECTING PHYSICAL SLIP AND WEAR COEFFICIENT OF CLUTCH

(71) Applicant: GREAT WALL MOTOR COMPANY LIMITED, Hebei (CN)

(72) Inventors: Zhitao Hu, Hebei (CN); Antonius Johannes Ma Van De Ven, Hebei (CN); Xiaodong Liu, Hebei (CN); Wenjian Liu, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 16/965,142

(22) PCT Filed: Jan. 30, 2019

(86) PCT No.: PCT/CN2019/073998
§ 371 (c)(1),
(2) Date: Jul. 27, 2020

(87) PCT Pub. No.: WO2019/149226
PCT Pub. Date: Aug. 8, 2019

(65) Prior Publication Data
US 2020/0378454 A1    Dec. 3, 2020

(30) Foreign Application Priority Data
Jan. 31, 2018    (CN) .......................... 201810096667.4

(51) Int. Cl.
*F16D 48/06*    (2006.01)
(52) U.S. Cl.
CPC ...... *F16D 48/06* (2013.01); *F16D 2500/3065* (2013.01); *F16D 2500/3068* (2013.01);
(Continued)

(58) Field of Classification Search
CPC ................. F16D 48/06; F16D 48/08; F16D 2500/30404; F16D 2500/30406;
(Continued)

(56) References Cited

U.S. PATENT DOCUMENTS

| | | |
|---|---|---|
| 6,253,140 B1 | 6/2001 | Jain et al. |
| 9,593,725 B2 | 3/2017 | Pritchard |

(Continued)

FOREIGN PATENT DOCUMENTS

| | | |
|---|---|---|
| CN | 1426513 A | 6/2003 |
| CN | 106641024 A | 5/2017 |

(Continued)

OTHER PUBLICATIONS

EESR for EP 19747963.7 dated Dec. 2, 2020, 7 pages.
(Continued)

*Primary Examiner* — Edwin A Young
(74) *Attorney, Agent, or Firm* — Nixon Peabody LLP; Jeffrey L. Costellia

(57) ABSTRACT

A method and apparatus for correcting a physical slip and wear coefficient of a clutch comprising obtaining a torque difference according to a positional relation between an engine and the clutch; obtaining a correction weight value corresponding to an engine torque according to the torque difference; and correcting the physical slip and wear coefficient according to the correction weight value and a running-in state of the clutch. The method relates to obtaining a torque difference in real time by means of a positional relation between the engine and the clutch in a manner corresponding to the positional relation, obtaining a correction weight value corresponding to the engine torque according to the torque difference, and further correcting the physical slip and wear coefficient by combining the correction weight value and a running-in state of the clutch.

18 Claims, 3 Drawing Sheets

(52) U.S. Cl.
CPC ............. *F16D 2500/30404* (2013.01); *F16D 2500/30406* (2013.01); *F16D 2500/30412* (2013.01); *F16D 2500/30421* (2013.01); *F16D 2500/30806* (2013.01); *F16D 2500/5023* (2013.01); *F16D 2500/7082* (2013.01)

(58) Field of Classification Search
CPC . F16D 2500/30412; F16D 2500/30421; F16D 2500/3065; F16D 2500/3068; F16D 2500/30806; F16D 2500/5023; F16D 2500/50233; F16D 2500/50245; F16D 2500/50281

See application file for complete search history.

(56) References Cited

U.S. PATENT DOCUMENTS

| | | | |
|---|---|---|---|
| 2014/0194247 A1 | 7/2014 | Burtch | |
| 2015/0167758 A1* | 6/2015 | Kim | G01L 1/2206 |
| | | | 701/68 |
| 2016/0025160 A1* | 1/2016 | Kim | F16D 48/066 |
| | | | 701/67 |
| 2017/0146078 A1* | 5/2017 | No | F16D 48/08 |
| 2018/0029601 A1* | 2/2018 | Goppert | F16D 48/06 |
| 2019/0093714 A1* | 3/2019 | Cho | F16D 48/06 |

FOREIGN PATENT DOCUMENTS

| | | |
|---|---|---|
| CN | 106969139 A | 7/2017 |
| CN | 107002778 A | 8/2017 |
| DE | 102012219034 A1 | 5/2013 |
| DE | 102016209998 B3 | 9/2017 |
| DE | 102016007237 A1 | 12/2017 |
| EP | 1820990 A1 | 8/2007 |
| KR | 20100007788 A | 1/2010 |
| WO | 2003019029 A1 | 3/2003 |

OTHER PUBLICATIONS

CN Office Action for CN20180096667.4 dated Aug. 19, 2019, 4 pages.
CN Search Report for CN20180096667.4 dated Aug. 9, 2019, 2 pages.
ISR for PCT/CN2019073998 dated Apr. 19, 2019, 6 pages.
WO for PCT/CN2019073998 dated Apr. 19, 2019, 8 pages.

* cited by examiner

METHOD AND APPARATUS FOR CORRECTING PHYSICAL SLIP AND WEAR COEFFICIENT OF CLUTCH

CROSS-REFERENCE TO RELATED APPLICATIONS

This application is the National Phase of International Application PCT/CN2019/073998, filed Jan. 30, 2019, which designated the United States. This application also claims priority under 35 U.S.C. § 119(a) and § 365(b) to Chinese Patent Application No. 201810096667.4, filed on Jan. 31, 2018, entitled "Method and Apparatus for Correcting Physical Slip and Wear Coefficient of Clutch", the entire contents of which are incorporated herein by reference.

FIELD OF TECHNOLOGY

The disclosure relates to the technical field of vehicle control, and more particularly, to a method and apparatus for correcting physical slip and wear coefficient of clutch.

BACKGROUND

With the continuous development of the automobile industry, a wet-type dual-clutch is gradually adopted by vehicles to transfer an engine torque. However, the wet-type dual-clutch will be worn during use, which causes change of a physical slip and wear coefficient of the clutch. Therefore, the physical slip and wear coefficient of the clutch needs to be corrected.

In the related art, a vehicle may calculate the physical slip and wear coefficient according to the engine torque and a clutch pressure, and obtain a plurality of physical slip and wear coefficients by continuous calculation, may further calculate an average physical slip and wear coefficient, and may finally correct the average physical slip and wear coefficient according to a transmission oil temperature, the clutch pressure and a clutch slip to obtain a corrected physical slip and wear coefficient.

However, the above process of correcting the physical slip and wear coefficient is to correct the physical slip and wear coefficient only for a micro-slip and wear stage, i.e., a case where a speed difference interval is small (e.g., a state where the vehicle runs smoothly), instead of a case where a large-slip and wear stage (e.g., a state where the vehicle starts or shifts), resulting in the problem that the correction of the physical slip and wear coefficient is not comprehensive.

SUMMARY

In view of this, an embodiment of the disclosure aims to provide a method for correcting physical slip and wear coefficient of clutch, which solves the problem of incomplete correction of a physical slip and wear coefficient caused by only correcting physical slip and wear coefficient at a certain stage.

In order to achieve the above object, the technical solutions of the disclosure are implemented as follows:

A method for correcting physical slip and wear coefficient of clutch is provided, which includes:

acquiring a torque difference according to a positional relationship between an engine and a clutch;

acquiring a correction weight corresponding to an engine torque according to the torque difference; and correcting a physical slip and wear coefficient according to the correction weight and a running-in state of the clutch.

Further, the step of acquiring a torque difference according to a positional relationship between an engine and a clutch includes:

acquiring a variation of an angle between the engine end and an input end of the clutch;

when the variation is less than a preset threshold, calculating the torque difference according to the engine torque, a torque of a going clutch, and a torque of a coming clutch; or when the variation is greater than or equal to the preset threshold, calculating the torque difference according to a rotational inertia and an angular acceleration of an engine end.

Further, the step of acquiring a correction weight corresponding to an engine torque according to the torque difference includes:

determining a torque interval corresponding to the engine torque according to the engine torque; and selecting a correction weight corresponding to the torque difference from at least one correction weight corresponding to the torque interval.

Further, the step of correcting a physical slip and wear coefficient according to the correction weight and a running-in state of the clutch includes:

correcting the running-in state of the clutch according to the correction weight, and obtaining a corrected running-in state; and interpolating between a physical slip and wear coefficient of a new clutch and a physical slip and wear coefficient of a clutch after running-in according to the corrected running-in state, and obtaining a corrected physical slip and wear coefficient.

Further, before the step of acquiring a torque difference according to a positional relationship between an engine and a clutch, the method for correcting physical slip and wear coefficient of clutch further includes:

determining whether a vehicle meets a preset condition according to a state parameter of the vehicle; and when the vehicle meets the preset condition, acquiring a state duration.

The step of acquiring a torque difference according to a positional relationship between an engine and a clutch includes:

when the state duration is not less than a preset time, acquiring the torque difference according to the positional relationship between the engine and the clutch.

Compared with the prior art, the method for correcting physical slip and wear coefficient of clutch described in the application has the following advantages:

According to the method for correcting physical slip and wear coefficient of clutch described in the disclosure, via the positional relationship between the engine and the clutch, the torque difference is acquired in a manner corresponding to the positional relationship. The torque difference may be acquired in real time, and the correction weight corresponding to the engine torque may be acquired according to the torque difference, and then the physical slip and wear coefficient may be corrected according to the correction weight and the running-in state of the clutch. The physical slip and wear coefficient is prevented from being corrected only under the condition that a rotating speed difference interval is small, the physical slip and wear coefficient can be corrected at any time, and the comprehensiveness and flexibility of physical slip and wear coefficient correction can be improved.

Another object of the disclosure is to provide an apparatus for correcting physical slip and wear coefficient of clutch, which solves the problem of incomplete correction of the physical slip and wear coefficient caused by only correcting the physical slip and wear coefficient at a certain stage.

In order to achieve the above object, the technical solutions of the disclosure are implemented as follows:

An apparatus for correcting physical slip and wear coefficient of clutch is provided, which includes:

a first acquisition module, configured to acquire a torque difference according to a positional relationship between an engine and a clutch;

a second acquisition module, configured to acquire a correction weight corresponding to an engine torque according to the torque difference; and a correction module, configured to correct a physical slip and wear coefficient according to the correction weight and a running-in state of the clutch.

Further, the first acquisition module includes:

a first acquisition sub-module, configured to acquire a variation of an angle between the engine end and an input end of the clutch;

a first calculation sub-module, configured to, when the variation is less than a preset threshold, calculate the torque difference according to the engine torque, a torque of a going clutch, and a torque of a coming clutch; and a second calculation sub-module, configured to, when the variation is greater than or equal to the preset threshold, calculate the torque difference according to a rotational inertia and an angular acceleration of the engine end.

Further, the second acquisition module includes:

an interval determination sub-module, configured to determine a torque interval corresponding to the engine torque according to the engine torque; and a selection sub-module, configured to select a correction weight corresponding to the torque difference from at least one correction weight corresponding to the torque interval.

Further, the correction module includes:

a correction sub-module, configured to correct the running-in state of the clutch according to the correction weight, and obtain a corrected running-in state; and an interpolation sub-module, configured to interpolate between a physical slip and wear coefficient of a new clutch and a physical slip and wear coefficient of a clutch after running-in according to the corrected running-in state, and obtain a corrected physical slip and wear coefficient.

Further, the apparatus for correcting physical slip and wear coefficient of clutch further includes:

a determination module, configured to determine whether a vehicle meets a preset condition according to a state parameter of the vehicle; and a third acquisition module, configured to, when the vehicle meets the preset condition, acquire a state duration;

wherein the first acquisition module includes:

a second acquisition sub-module, configured to, when the state duration is not less than a preset time, acquire the torque difference according to the positional relationship between the engine and the clutch.

The apparatus for correcting physical slip and wear coefficient of clutch has the same advantages as the method for correcting physical slip and wear coefficient of clutch with respect to the prior art, and the descriptions are omitted herein.

The above description is only an overview of the technical solutions of the disclosure. In order to understand the technical means of the disclosure more clearly, it may be implemented in accordance with the contents of the specification, and in order to make the above and other objects, features and advantages of the disclosure more obvious and understandable, the specific implementation modes of the disclosure are listed below.

BRIEF DESCRIPTION OF THE DRAWINGS

The drawings constituting a part of the disclosure are used to provide a further understanding of the disclosure. The schematic embodiments and descriptions of the disclosure are used to explain the disclosure and do not constitute an improper limitation on the disclosure. In the drawings.

DESCRIPTION OF THE EMBODIMENTS

To make the objects, technical solutions and advantages of the embodiments of the disclosure clearer, the technical solutions in the embodiments of the disclosure will be described clearly and completely in conjunction with the drawings in the embodiments of the disclosure. Obviously, the described embodiments are a part of the embodiments of the disclosure, but not all the embodiments. Based on the embodiments in the disclosure, all other embodiments obtained by those of ordinary skill in the art without making any creative work are within the scope of protection of the disclosure. It should be noted that the embodiments of the disclosure and the features in the embodiments may be combined with each other without conflict.

The disclosure will be described in detail below with reference to the drawings and in conjunction with the embodiments.

Figure 1:
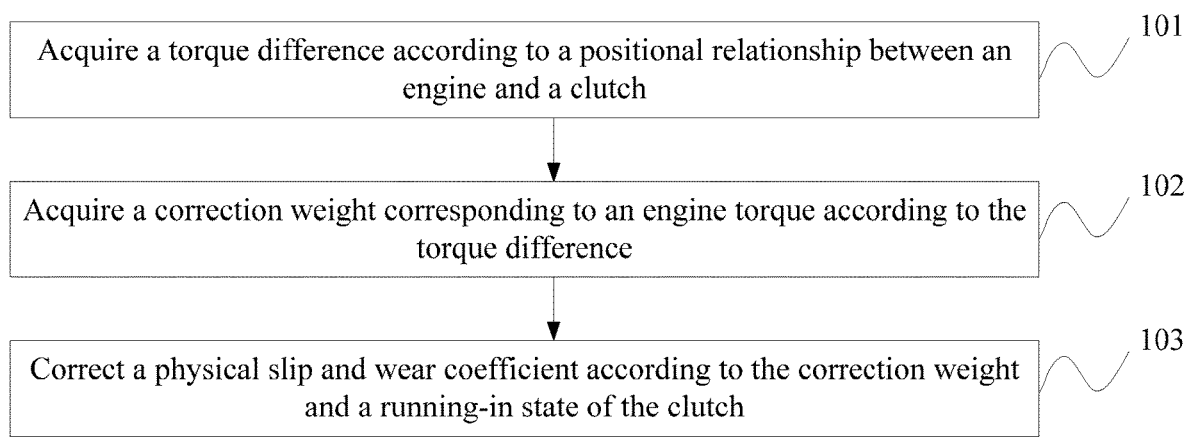
FIG. 1 is a flow chart of steps of a method for correcting physical slip and wear coefficient of clutch according to an embodiment of the disclosure.

Referring to FIG. 1, there is shown a flow chart of steps of a method for correcting physical slip and wear coefficient of clutch according to an embodiment of the disclosure, which may specifically include the following steps.

In step 101, acquiring a torque difference according to a positional relationship between an engine and a clutch.

The torque difference is a difference value between a current clutch torque and an engine torque.

In the running process of a vehicle, the clutch of the vehicle may transmit the engine torque, so that the vehicle can normally run. An engine end of the engine of the vehicle is used for outputting power. There is a dynamically changing angle between an input end of the clutch of the vehicle and the engine end, and it may be determined whether the clutch and the engine are in a dynamic balance state according to the dynamically changing angle, so that the torque difference is acquired in a manner corresponding to the determination result.

Specifically, the vehicle may monitor the positional relationship between the engine and the clutch, and determine whether the angle between the engine end and the input end of the clutch changes. For example, the vehicle may determine whether the angle between the engine end and the input end of the clutch continuously increases, so that a corresponding calculation mode is selected according to the determination result, and the torque difference is calculated finally according to the selected calculation mode.

When it is monitored that the angle between the engine end and the input end of the clutch does not change, but the dynamic balance is held and is not relatively increased, the torque difference may be calculated according to a clutch torque and the engine torque. However, when it is monitored that the angle between the engine end and the input end of the clutch is still changing, it is indicated that the engine and the clutch are not in the dynamic balance state, and the torque difference may be calculated according to a rotational inertia and an angular acceleration of the engine end.

In step 102, acquiring a correction weight corresponding to an engine torque according to the torque difference.

After the torque difference is acquired, the vehicle may determine a torque interval corresponding to the current engine torque, and then searches a correction weight corresponding to an interval where the torque difference is located from a plurality of correction weights corresponding to the torque interval.

Wherein, the torque interval may correspond to a plurality of correction weights, and each correction weight corresponds to a torque difference interval.

In step 103, correcting a physical slip and wear coefficient according to the correction weight and a running-in state of the clutch.

Wherein, the running-in state of the clutch is used for indicating a running-in degree of the clutch of the vehicle.

After the vehicle acquiring the correction weight, the running-in state of the clutch may be corrected according to the correction weight to obtain a corrected running-in state of the clutch, and interpolation is carried out between a preset physical slip and wear coefficient of a new clutch and a physical slip and wear coefficient of a clutch after running-in according to the corrected running-in state of the clutch to obtain a corrected physical slip and wear coefficient.

To sum up, according to the method for correcting physical slip and wear coefficient of clutch provided in the embodiment of the disclosure, via the positional relationship between the engine and the clutch, the torque difference is acquired in a manner corresponding to the positional relationship. The torque difference may be acquired in real time, the correction weight corresponding to the engine torque may be acquired according to the torque difference, and then the physical slip and wear coefficient may be corrected according to the correction weight and the running-in state of the clutch. The physical slip and wear coefficient is prevented from being corrected only under the condition that a rotating speed difference interval is small, the physical slip and wear coefficient can be corrected at any time, and the comprehensiveness and flexibility of the physical slip and wear coefficient correction can be improved.

Figure 2:
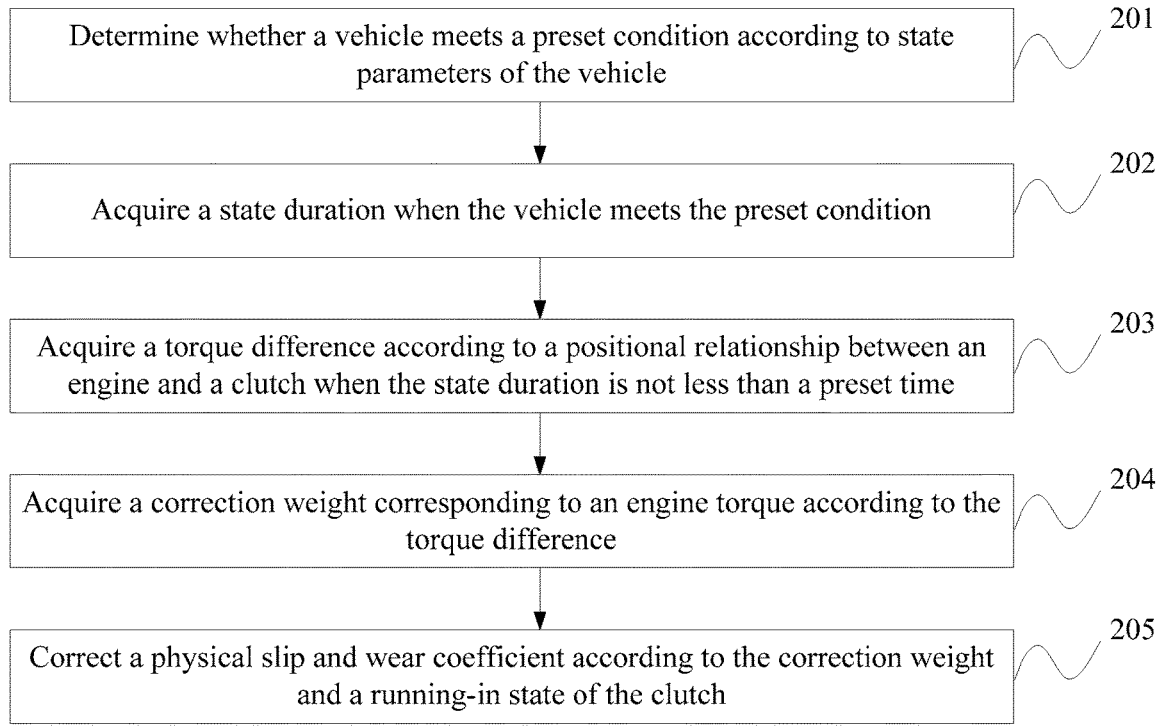
FIG. 2 is a flow chart of steps of another method for correcting physical slip and wear coefficient of clutch according to an embodiment of the disclosure.

Referring to FIG. 2, there is shown a flow chart of steps of another method for correcting physical slip and wear coefficient of clutch according to an embodiment of the disclosure, which may specifically include the following steps.

In step 201, determining whether a vehicle meets a preset condition according to a state parameter of the vehicle.

In order to accurately transmit the engine torque, the physical slip and wear coefficient of the clutch needs to be corrected in the running process of the vehicle. And before correcting the physical slip and wear coefficient, it is necessary to determine whether a current state of the vehicle meets a preset condition according to the state parameter of the vehicle, so as to determine whether the physical slip and wear coefficient needs to be corrected according to the determination result in the subsequent step.

Specifically, in the running process of the vehicle, at least one state parameter of the vehicle may be acquired, a preset condition corresponding to each state parameter is determined according to each state parameter, and it is determined whether each state parameter meets the corresponding preset condition.

Wherein, the state parameter may include: at least one of parameters such as a vehicle gear, an oil temperature and a micro-slip and wear integral control torque. Correspondingly, the preset condition corresponding to each state parameter may include: the vehicle gear is higher than or equal to a preset gear, the oil temperature is in a preset temperature interval, and the micro-slip and wear integral control torque is less than a preset torque.

For example, the preset gear may be a third gear position and the preset temperature interval may be 40° C. (degrees Celsius) to 90° C. The vehicle is in the third gear position and above, which generally means small speed ratio variation and small speed fluctuation.

In some embodiments, the micro-slip and wear integral control torque may be directly collected or obtained via calculation, and the determination of the micro-slip and wear integral control torque is common knowledge in the art and is not limited thereto. The preset torque may be, for example, about 5% of the engine torque, e.g. between 3% and 10%, or between 4% and 7%. The preset torque is determined according to the magnitude of the engine torque and used to limit the micro-slip and wear integral torque. The micro-slip and wear integral torque less than the preset torque means that the clutch and the engine are in a relatively stable state.

It is to be noted that, in practice, the vehicle may include a plurality of state parameters, each state parameter corresponding to a preset condition. For example, the above state parameter may also include the following: relative slip and wear angle parameters of the engine end and the input end of the clutch; engine speed limitation and stability parameters; engine torque stability parameters; engine torque range; parameters of determining that the vehicle enters a stable state based on a micro-slip and wear angle; water temperature parameters of the engine, etc. Each state parameter may correspond to a specific preset condition, and will not be described in detail herein. Step 202 is performed when each state parameter meets a corresponding preset condition. However, if any one of the plurality of state parameters does not meet the corresponding preset condition, it is indicated that the vehicle cannot correct the physical slip and wear coefficient and the subsequent steps are not performed, but step 201 is cyclically performed until each state parameter meets the corresponding preset condition.

In step 202, when the vehicle meets the preset condition, acquiring a state duration.

The state duration is used for indicating a duration that the state parameter of the vehicle continuously meets the preset condition.

When the vehicle determines that the state parameter meets the corresponding preset condition, namely the vehicle meets the preset condition, the duration of the vehicle meeting the preset condition needs to be monitored so as to determine whether the vehicle is stably in the current state according to the monitored duration.

Specifically, when the vehicle meets the preset condition, each state parameter of the vehicle may be monitored, the duration of each state parameter meeting the corresponding preset condition is acquired, and the state duration is obtained, so that in the subsequent step, the vehicle may determine whether the vehicle is stably in the current state according to the state duration.

When the vehicle monitors that the state duration corresponding to each state parameter reaches a preset time set in advance, step 203 may be performed. However, if the vehicle detects that the duration for which a certain state parameter meets a corresponding preset condition is less than the preset time, it is indicated that the vehicle is not stably maintained in the current state, the physical slip and wear coefficient cannot be corrected, and steps 201 and 202 need to be performed again until the state duration of the vehicle reaches the preset time, that is, the state duration is not less than the preset time.

In step 203, when the state duration is not less than the preset time, acquiring the torque difference according to the positional relationship between the engine and the clutch.

When the acquired state duration reaches the preset time, namely the state duration is greater than or equal to the preset time, the vehicle may be determined to be in the current state stably, and the torque difference may be acquired according to the positional relationship between the vehicle engine and the clutch.

Specifically, when the state duration is not less than the preset time, the vehicle may acquire the positional relationship between the engine end and the input end of the clutch, that is, acquire a dynamically changing angle formed between the engine end and the input end of the clutch, further confirm whether a coming clutch of the clutches can carry on all engine torques according to a variation of the angle, and finally select a corresponding manner to acquire the torque difference according to the confirmation result.

Optionally, the vehicle may acquire the variation of the angle between the engine end and the input end of the clutch. When the variation is less than a preset threshold, the torque difference is calculated according to the engine torque, a torque of a going clutch and the torque of the coming clutch. However, when the variation is greater than or equal to the preset threshold, the torque difference may be calculated according to a rotational inertia and an angular acceleration of the engine end.

Since the angle between the engine end and the input end of the clutch dynamically changes, when the variation of the angle between the engine end and the input end of the clutch is 0 or is a certain extremely small parameter value, it is indicated that the coming clutch and the engine are in dynamic balance, the angle between the engine end and the input end of the clutch may be not continuously increased, and then the coming clutch can carry on all engine torques. However, when the variation of the angle between the input end of the clutch and the engine end is greater than or equal to the preset threshold, it is indicated that the angle between the engine end and the input end of the clutch may be still continuously increased and there is still relative slip and wear between the input end of the clutch and the engine end.

Therefore, the vehicle may determine whether the angle between the input end of the clutch and the engine end changes according to the positional relationship between the clutch and the engine, so that the torque difference is acquired in a corresponding manner according to the determination result.

Specifically, after the vehicle acquiring the variation of the angle, it may be determined whether the angle between the engine end and the input end of the clutch is relatively increased according to the acquired variation. When the variation indicates that the angle between the engine end and the input end of the clutch is not increased, the torque difference may be obtained by calculating in a manner corresponding to the current state.

For example, when it is determined that the variation of the angle between the engine end and the input end of the clutch is less than the preset threshold, or when it is determined that the angle between the engine end and the input end of the clutch is not increased, the sum of the current engine torque and the torque of the going clutch may be obtained by summation according to them, the torque of the coming clutch may be subtracted from the sum, and the torque difference may be obtained finally.

Wherein, when the torque of the going clutch is negative, a value of the torque is 0.

Correspondingly, if the variation indicates that the angle between the engine end and the input end of the clutch is greater than or equal to the preset threshold after the vehicle acquires the variation, it is indicated that the angle between the engine end and the input end of the clutch is still continuously increased, the engine and the coming clutch are not in a dynamic balance state, and the torque difference may be calculated according to the rotational inertia and the angular acceleration of the engine end.

For example, when it is determined that the angle between the engine end and the input end of the clutch is continuously increased, the rotational inertia of the engine end may be multiplied by the angular acceleration of the engine end to obtain a product of them, and finally the obtained product may be taken as the torque difference.

In step 204, acquiring a correction weight corresponding to an engine torque according to the torque difference.

After the vehicle acquiring the torque difference, the current engine torque may be continuously acquired, so that a matched torque interval is searched from a plurality of preset torque intervals according to the engine torque, and the correction weight corresponding to the torque difference is selected from a plurality of correction weights corresponding to the matched torque interval.

Optionally, the vehicle may determine the torque interval corresponding to the engine torque according to the engine torque, and select the correction weight corresponding to the torque difference from at least one correction weight corresponding to the torque interval.

Specifically, the vehicle may determine the torque interval corresponding to engine torque according to the preset torque intervals, and then select the correction weight corresponding to the torque interval where the torque difference is located from the plurality of correction weights corresponding to the torque interval according to the interval where the acquired torque difference is located.

For example, as shown in Table 1, Engine T0, Engine T1 and Engine T2 are respective intervals corresponding to the engine torques, and $\Delta T0$, $\Delta T1$, $\Delta T2$, and $\Delta T3$ are different intervals corresponding to the torque differences. When the torque difference acquired by the vehicle corresponds to the interval of $\Delta T2$ and the current engine torque corresponds to the interval of Engine T1, MuOffset12 may be acquired as a corresponding correction weight.

TABLE 1

| | ΔT0 | ΔT1 | ΔT2 | ΔT3 |
|---|---|---|---|---|
| Engine T0 | MuOffset00 | MuOffset01 | MuOffset02 | MuOffset03 |
| Engine T1 | MuOffset10 | MuOffset11 | MuOffset12 | MuOffset13 |
| Engine T2 | MuOffset20 | MuOffset21 | MuOffset22 | MuOffset23 |

In step 205, correcting a physical slip and wear coefficient according to the correction weight and a running-in state of the clutch.

The running-in state of the clutch is used for indicating a running-in degree of the clutch of the vehicle.

After the vehicle selects the corresponding correction weight, a preset running-in state of the clutch may be corrected according to the correction weight to obtain a corrected running-in state of the clutch, and finally a corrected physical slip and wear coefficient is calculated according to the corrected running-in state of the clutch and a plurality of preset physical slip and wear coefficients.

Optionally, the vehicle may correct the running-in state of the clutch according to the correction weight to obtain a corrected running-in state, and interpolate between a physical slip and wear coefficient of a new clutch and a physical slip and wear coefficient of a clutch after running-in according to the corrected running-in state to obtain a corrected physical slip and wear coefficient.

Specifically, the vehicle may interpolate between the physical slip and wear coefficient of the new clutch and the physical slip and wear coefficient of the clutch after running-in according to a running-in degree by interpolation, and correct the running-in degree through the correction weight to finally obtain the corrected physical slip and wear coefficient.

For example, the vehicle may correct the physical slip and wear coefficient according to a preset correction formula, and the correction formula may be $E=A*[1-(C+D)]+B*(C+D)$, wherein, E is the corrected physical slip and wear coefficient, A is the physical slip and wear coefficient of the new clutch, B is the physical slip and wear coefficient of the clutch after running-in, C is the running-in degree, and D is the correction weight.

To sum up, according to the method for correcting physical slip and wear coefficient of clutch provided in the embodiment of the disclosure, via the positional relationship between the engine and the clutch, the torque difference is acquired in a manner corresponding to the positional relationship. The torque difference may be acquired in real time, a correction weight corresponding to the engine torque may be acquired according to the torque difference, and then a physical slip and wear coefficient may be corrected according to the correction weight and the running-in state of the clutch. The physical slip and wear coefficient is prevented from being corrected only under the condition that a rotating speed difference interval is small, the physical slip and wear coefficient can be corrected at any time, and the comprehensiveness and flexibility of the physical slip and wear coefficient correction can be improved.

Figure 3:
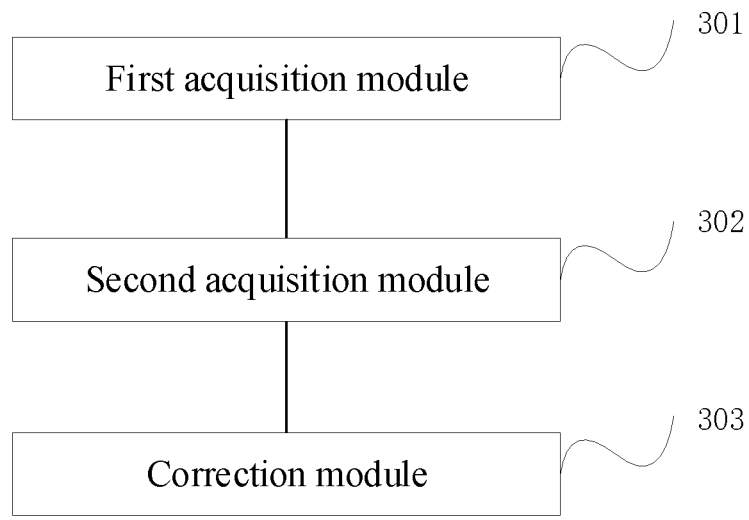
FIG. 3 is a structural block diagram of an apparatus for correcting physical slip and wear coefficient of clutch according to an embodiment of the disclosure.

Referring to FIG. 3, there is shown a structural block diagram of an apparatus for correcting physical slip and wear coefficient of clutch according to an embodiment of the disclosure, which may specifically include:

a first acquisition module 301, configured to acquire a torque difference according to a positional relationship between an engine and a clutch;

a second acquisition module 302, configured to acquire a correction weight corresponding to an engine torque according to the torque difference; and a correction module 303, configured to correct a physical slip and wear coefficient according to the correction weight and a running-in state of the clutch.

Further, the first acquisition module 301 includes:

a first acquisition sub-module, configured to acquire a variation of an angle between the engine end and an input end of the clutch;

a first calculation sub-module, configured to, when the variation is less than a preset threshold, calculate the torque difference according to the engine torque, a torque of a going clutch, and a torque of a coming clutch; and a second calculation sub-module, configured to, when the variation is greater than or equal to the preset threshold, calculate the torque difference according to a rotational inertia and an angular acceleration of the engine end.

Further, the second acquisition module 302 includes:

an interval determination sub-module, configured to determine a torque interval corresponding to the engine torque according to the engine torque; and a selection sub-module, configured to select a correction weight corresponding to the torque difference from at least one correction weight corresponding to the torque interval.

Further, the correction module 303 includes:

a correction sub-module, configured to correct the running-in state of the clutch according to the correction weight, and obtain a corrected running-in state; and an interpolation sub-module, configured to interpolate between a physical slip and wear coefficient of a new clutch and a physical slip and wear coefficient of a clutch after running-in according to the corrected running-in state, and obtain a corrected physical slip and wear coefficient.

Further, the apparatus for correcting physical slip and wear coefficient of clutch further includes:

a determination module, configured to determine whether a vehicle meets a preset condition according to a state parameter of the vehicle; and a third acquisition module, configured to, when the vehicle meets the preset condition, acquire a state duration.

The first acquisition module 301 includes:

a second acquisition sub-module, configured to, when the state duration is not less than a preset time, acquire the torque difference according to the positional relationship between the engine and the clutch.

The apparatus embodiments described above are merely schematic. The units described as separate components may or may not be physically separated, and the components displayed as units may or may not be physical units, which may be located in one place or distributed to a plurality of network units. Some or all of the modules may be selected according to actual needs to achieve the object of the solution of the present embodiment. Those of ordinary skill in the art may understand and implement without making any creative work.

Various component embodiments of the disclosure may be implemented in hardware, or in software modules running on one or more processors, or in a combination thereof. Those skilled in the art will appreciate that a microprocessor or digital signal processor (DSP) may be used in practice to perform some or all of the functions of some or all of the components of a computing processing device according to an embodiment of the disclosure. The disclosure may also be embodied as apparatus or apparatus programs (e.g. computer programs and computer program products) for performing some or all of the methods described herein. Such a program embodying the disclosure may be stored on a computer-readable medium or may be in the form of one or more signals. Such a signal may be downloaded from an Internet web site, or provided on a carrier signal, or provided in any other form.

Figure 4:
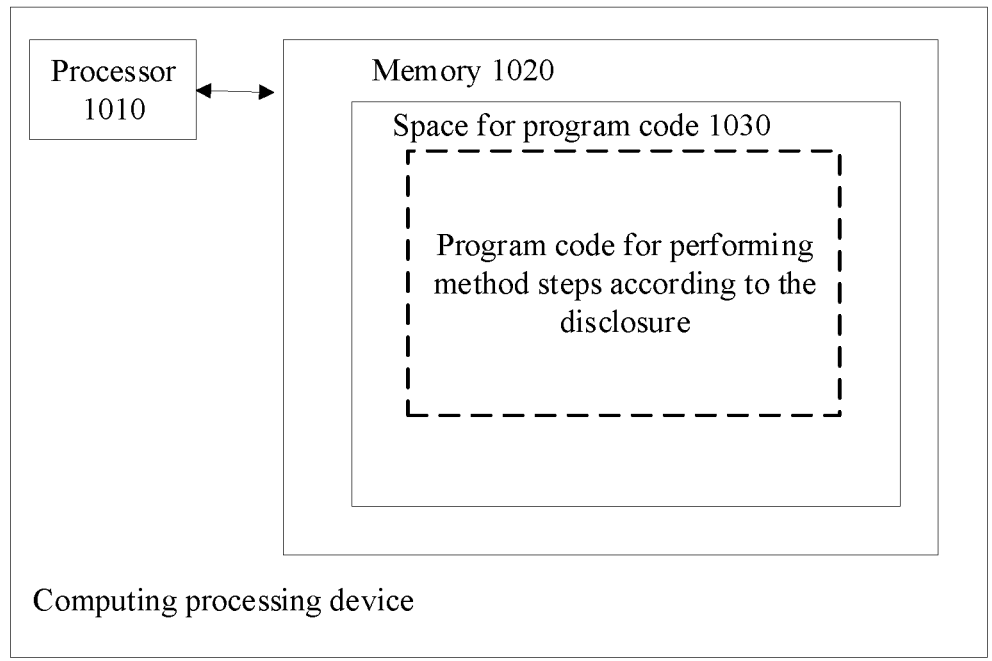
FIG. 4 schematically shows a block diagram of a computing processing device for implementing a method according to the disclosure.
Figure 5:
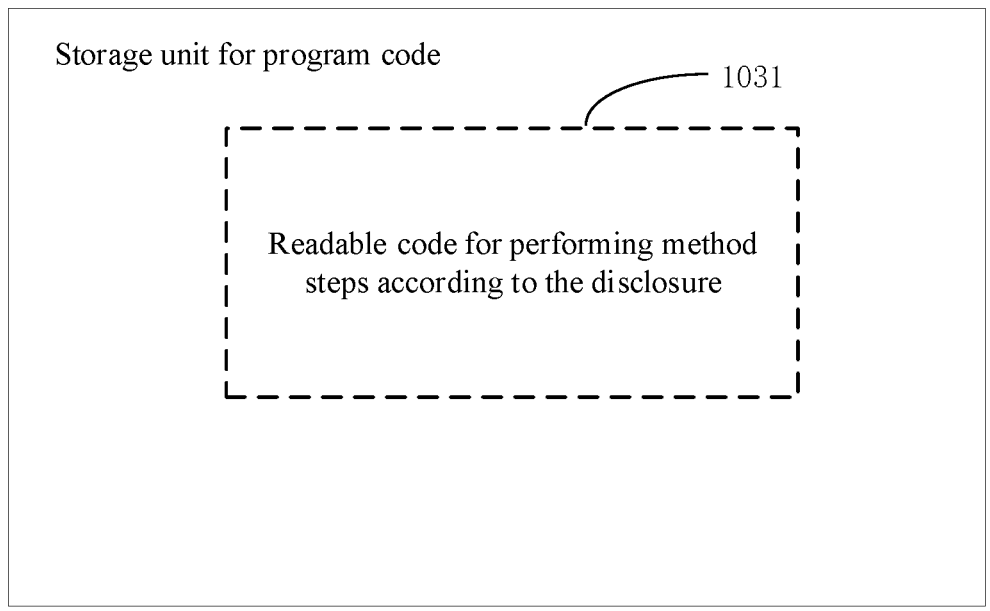
FIG. 5 schematically shows a storage unit for holding or carrying program codes for implementing a method according to the disclosure.

For example, FIG. 4 shows a computing processing device in which the method according to the disclosure may be implemented. The computing processing device conventionally includes a processor 1010 and a computer program product or computer-readable medium in the form of a memory 1020. The memory 1020 may be an electronic memory such as a flash memory, an EEPROM (Electrically Erasable Programmable Read Only Memory), an EPROM, a hard disk, or a ROM. The memory 1020 has a storage space 1030 for program codes 1031 for performing any of the method steps in the above methods. For example, the storage space 1030 for program codes may include respective program codes 1031 for implementing the various steps in the above methods, respectively. The program codes may be read from or written to one or more computer program products. These computer program products include a program code carrier such as a hard disk, a compact disk (CD), a memory card or a floppy disk. Such a computer program product is typically a portable or fixed storage unit as described with reference to FIG. 5. The storage unit may have storage segments, storage space, etc., arranged similarly to the memory 1020 in the computing processing device of FIG. 4. The program codes may be compressed, for example, in a suitable form. Typically, the storage unit includes computer-readable codes 1031', i.e., codes readable by a processor, such as 1010, for example, which, when executed by a computing processing device, causes the computing processing device to perform the various steps of the methods described above.

"One embodiment", "embodiment" or "one or more embodiments" referred to herein means that a particular feature, structure, or characteristic described in connection with the embodiment is included in at least one embodiment of the disclosure. In addition, it is noted that the word "in one embodiment" does not necessarily all refer to the same embodiment.

In the specification provided herein, numerous specific details are set forth. However, it is understood that the embodiments of the disclosure may be practiced without these specific details. In some instances, well-known methods, structures and techniques have not been shown in detail in order not to obscure the understanding of this specification.

In the claims, any reference signs placed between parentheses shall not be construed as limiting the claims. The word "comprise" does not exclude the presence of elements or steps not listed in the claims. The word "a/an" or "one" preceding an element does not exclude the presence of a plurality of such elements. The disclosure may be implemented by means of hardware including several different elements, and by means of a suitably programmed computer. In the unit claims enumerating several apparatuses, several of these apparatuses may be embodied by one and the same item of hardware. The use of the words first, second, third, etc., do not denote any order. These words may be interpreted as names.

Finally, it should be noted that the above embodiments are only to illustrate the technical solutions of the disclosure, not to limit it. Although the disclosure has been described in detail with reference to the foregoing embodiments, those of ordinary skill in the art will understand that it is still possible to modify the technical solutions described in the foregoing embodiments, or to replace some of the technical features equally. Such modifications and replacements do not depart the essence of the corresponding technical solutions from the spirit and scope of the technical solutions of the respective embodiments of the disclosure.

What is claimed is:

1. A method for correcting physical slip and wear coefficient of clutch, comprising:
    acquiring a torque difference according to a positional relationship between an engine and a clutch;
    acquiring a correction weight corresponding to an engine torque according to the torque difference; and
    correcting a physical slip and wear coefficient according to the correction weight and a running-in state of the clutch;
    wherein before the step of acquiring a torque difference according to a positional relationship between an engine and a clutch, the method for correcting physical slip and wear coefficient of clutch further comprises:
    determining whether a vehicle meets a preset condition according to a state parameter of the vehicle; and
    when the vehicle meets the preset condition, acquiring a state duration; and
    the step of acquiring a torque difference according to a positional relationship between an engine and a clutch comprises:
    when the state duration is not less than a preset time, acquiring the torque difference according to the positional relationship between the engine and the clutch.

2. The method for correcting physical slip and wear coefficient of clutch according to claim 1, wherein the step of acquiring a torque difference according to a positional relationship between an engine and a clutch comprises:
    acquiring a variation of an angle between an engine end and an input end of the clutch; and
    when the variation is less than a preset threshold, calculating the torque difference according to the engine torque, a torque of a going clutch, and a torque of a coming clutch.

3. The method for correcting physical slip and wear coefficient of clutch according to claim 2, wherein the step of acquiring a torque difference according to a positional relationship between an engine and a clutch further comprises:
    when the variation is greater than or equal to the preset threshold, calculating the torque difference according to a rotational inertia and an angular acceleration of the engine end.

4. The method for correcting physical slip and wear coefficient of clutch according to claim 1, wherein the step of acquiring a correction weight corresponding to an engine torque according to the torque difference comprises:
    determining a torque interval corresponding to the engine torque according to the engine torque; and
    selecting a correction weight corresponding to the torque difference from at least one correction weight corresponding to the torque interval.

5. The method for correcting physical slip and wear coefficient of clutch according to claim 1, wherein the step of correcting a physical slip and wear coefficient according to the correction weight and a running-in state of the clutch comprises:
    correcting the running-in state of the clutch according to the correction weight, and obtaining a corrected running-in state; and
    interpolating between a physical slip and wear coefficient of a new clutch and a physical slip and wear coefficient of a clutch after running-in according to the corrected running-in state, and obtaining a corrected physical slip and wear coefficient.

6. The method for correcting physical slip and wear coefficient of clutch according to claim 1, wherein the preset condition comprises at least one of the following:
a vehicle gear is higher than or equal to a preset gear;
an oil temperature is in a preset temperature interval; and
a micro-slip and wear integral control torque of the vehicle is less than a preset torque.

7. The method for correcting physical slip and wear coefficient of clutch according to claim 6, wherein the preset temperature interval is from 40° C. to 90° C.

8. The method for correcting physical slip and wear coefficient of clutch according to claim 7, wherein the preset torque ranges from 3% to 10% of the engine torque.

9. A computer program, comprising a computer-readable code which, when executed by a computing processing device, causes the computing processing device to perform the method for correcting physical slip and wear coefficient of clutch according to claim 1.

10. A computer-readable medium, storing the computer program according to claim 9.

11. A computing processing device for correcting physical slip and wear coefficient of clutch, wherein the computing processing device comprises a processor and a memory, wherein the memory stores a program code for implementing the operations of:
acquiring a torque difference according to a positional relationship between an engine and a clutch;
acquiring a correction weight corresponding to an engine torque according to the torque difference; and
correcting a physical slip and wear coefficient according to the correction weight and a running-in state of the clutch;
wherein the memory further stores a program code for implementing the operations of
determining whether a vehicle meets a preset condition according to a state parameter of the vehicle; and
when the vehicle meets the preset condition, acquiring a state duration; and
the operation of acquiring a torque difference according to a positional relationship between an engine and a clutch comprises:
when the state duration is not less than a preset time, acquiring the torque difference according to the positional relationship between the engine and the clutch.

12. The computing processing device for correcting physical slip and wear coefficient of clutch according to claim 11, wherein the operation of acquiring a torque difference according to a positional relationship between an engine and a clutch comprises:
acquiring a variation of an angle between an engine end and an input end of the clutch; and
when the variation is less than a preset threshold, calculating the torque difference according to the engine torque, a torque of a going clutch, and a torque of a coming clutch.

13. The computing processing device for correcting physical slip and wear coefficient of clutch according to claim 12, wherein the operation of acquiring a torque difference according to a positional relationship between an engine and a clutch further comprises:
when the variation is greater than or equal to the preset threshold, calculating the torque difference according to a rotational inertia and an angular acceleration of the engine end.

14. The computing processing device for correcting physical slip and wear coefficient of clutch according to claim 11, wherein the operation of acquiring a correction weight corresponding to an engine torque according to the torque difference comprises:
determining a torque interval corresponding to the engine torque according to the engine torque; and
selecting a correction weight corresponding to the torque difference from at least one correction weight corresponding to the torque interval.

15. The computing processing device for correcting physical slip and wear coefficient of clutch according to claim 11, wherein the operation of correcting a physical slip and wear coefficient according to the correction weight and a running-in state of the clutch comprises:
correcting the running-in state of the clutch according to the correction weight, and obtain a corrected running-in state; and
interpolating between a physical slip and wear coefficient of a new clutch and a physical slip and wear coefficient of a clutch after running-in according to the corrected running-in state, and obtain a corrected physical slip and wear coefficient.

16. The computing processing device for correcting physical slip and wear coefficient of clutch according to claim 11, wherein the preset condition comprises at least one of the following:
a vehicle gear is higher than or equal to a preset gear;
an oil temperature is in a preset temperature interval; and
a micro-slip and wear integral control torque of the vehicle is less than a preset torque.

17. The computing processing device for correcting physical slip and wear coefficient of clutch according to claim 16, wherein the preset temperature interval is from 40° C. to 90° C.

18. The computing processing device for correcting physical slip and wear coefficient of clutch according to claim 17, wherein the preset torque ranges from 3% to 10% of the engine torque.

* * * * *